United States Patent [19]

Bloom et al.

[11] Patent Number: 4,591,969

[45] Date of Patent: May 27, 1986

[54] MICROPROCESSOR-CONTROLLED POSITIONING SYSTEM

[75] Inventors: Robert D. Bloom, Montrose, Pa.; Edward J. Burke, Apalachin; Eugene T. Kozol, Binghamton, both of N.Y.

[73] Assignee: International Business Machines Corporation, Armonk, N.Y.

[21] Appl. No.: 522,144

[22] Filed: Aug. 11, 1983

[51] Int. Cl.$^4$ .................. G05B 11/01; B41J 11/42
[52] U.S. Cl. ...................... 364/183; 364/174; 364/519; 318/603; 400/583; 400/582; 400/902
[58] Field of Search ............. 364/174, 183, 519; 400/568, 582, 583.1–583.4, 584, 902; 318/594, 603

[56] References Cited

U.S. PATENT DOCUMENTS

| | | | |
|---|---|---|---|
| 3,872,960 | 3/1975 | Gabor | 400/568 |
| 3,949,856 | 4/1976 | Ulber et al. | 400/583.2 |
| 4,261,039 | 4/1981 | Baker et al. | 364/171 |
| 4,277,191 | 7/1981 | Davis et al. | 400/583 |
| 4,304,497 | 12/1981 | Cavill et al. | 400/583 |
| 4,312,033 | 1/1982 | Sweeney et al. | 318/594 |
| 4,349,770 | 9/1982 | Ragen | 400/582 |

OTHER PUBLICATIONS

"Grating Position Up/Down Counter Controller", Carmichael, J. M. et al., IBM Technical Bulletin, vol. 16, No. 10, Mar. 1974, pp. 3306-3307.
"Software-Hardware Dual Mode Servo", Anders, F. G., IBM Technical Bulletin, vol. 20, No. 1, Jun. 1977, pp. 63-64.

Primary Examiner—Jerry Smith
Assistant Examiner—John R. Lastova
Attorney, Agent, or Firm—John S. Gasper

[57] ABSTRACT

A positioning system for a line printer uses dc servomotors for driving a forms feed mechanism in increments of one or more line spaces at a time. The system includes a microprocessor and a position counter that counts either ¼ or 1 degree displacement pulses generated by a motion indicating means including optical transducers and an emitter disk coupled to the motors. The motion indicating means includes an error hold and compensation counter that counts and stores ¼ degree pulses generated during error movement of the motors relative to a stop position during the uncontrolled state and supplies a corrected 1 degree pulse to the position counter upon start up.

5 Claims, 7 Drawing Figures

MICROPROCESSOR-CONTROLLED POSITIONING SYSTEM

FIELD OF THE INVENTION

This invention relates to positioning systems and particularly to such systems that operate in conjunction with a microprocessor or the like. The invention is described in connection with a microprocessor-controlled printer carriage using a dc servomotor for positioning a document for the performance of printing lines of data thereon.

BACKGROUND OF THE INVENTION

Positioning systems in high speed printers for data processing systems include a paper carriage mechanism driven by a dc motor operated by electronic controls to feed paper one or more print line spaces at a time relative to a print line defined by impression devices such as print hammers. The positioning operation consists of accelerating the motor quickly to a selected velocity, maintaining the velocity constant until a selected position is reached, and then decelerating the motor to a desired stop or detent position whereupon the motor is deenergized and printing can commence. The electronic controls might include a microprocessor or other controller and a position counter which counts displacement signals generated by an optical or other type encoder device coupled to the motor and/or the carriage drive shaft. The optical encoder device typically comprises a pair of light sensors and an opaque disk having one or more tracks with uniformly spaced transparent indicia. The sensors, the disk, and a light source are arranged so that a pair of motion signals are generated in phase quadrature in response to motor rotation. Decode or other circuitry converts the phased signals into a direction signal and displacement pulses where each pulse indicates movement of a fraction of a line space. The microprocessor, in addition to other control functions involving the motor and other devices associated with the printer, sets the position counter prior to and during motor operation to count the displacement pulses to effect the sequence of motor control operations described.

The rapid starting and stopping of the carriage mechanism and associated mechanisms produces mechanical perturbations which cause undesired movement of the carriage mechanism, the motor, and the paper. The direction and magnitude of this drift movement is essentially variable and irregular. Unlike a stepper motor, the dc motor has no holding torque opposing this undesired movement. Consequently, the motor is periodically operated during printing to reposition the paper. During printing, the electronics control has ample time to detect the direction and magnitude of the undesired movement and to operate the motor to restore the paper to the desired print line. However, in the interval between the end of printing and the start of motor operation, i.e., when the microprocessor is setting the position counter and performing other control functions in preparation for the next move, the microprocessor cannot also operate to monitor and correct for movement since its function is sequential. Therefore, any movement occurring during this time interval results in the loss of carriage position. Consequently, subsequent motor operations result in irregular spacing of the paper causing poor vertical registration due to the nonuniform spacing of the lines of printed data. It is the purpose of this invention to provide an improved control system for a dc motor which solves the problem of drift movement, does not require microprocessor intervention or direct control, and thereby eliminates positioning errors particularly line positioning errors of a print medium in a line printer.

BACKGROUND ART

U.S. Pat. No. 4,261,038 issued Apr. 7, 1981 to G. N. Baker et al describes a microprocessor-controlled paper feed mechanism for a printer. The microprocessor analyzes relatively slow emitter pulses for start up, normal speed and high speed paper feed and relatively high frequency emitter pulses during deceleration and stopping of the forms.

Publication of J. M. Carmichael et al IBM Technical Disclosure Bulletin, Vol. 16, No. 10, March 1974, pp 3306–07 describes an up/down counter controller capable of tracking position grating transitions under mechanical vibration of a print head carrier.

Publication of F. G. Anders, IBM Technical Disclosure Bulletin, Vol. 20, No. 1, June 1977, pp 63–64 describes a microcomputer and hardware for controlling servo circuits of a printer carriage. The microcomputer senses drift of the hardware circuits to return the carriage to center.

SUMMARY OF THE INVENTION

This invention provides a control for a dc motor driven positioning system and particularly for a dc motor driven paper feed mechanism of a printer which corrects for errors in the initial position of the motor caused by undesired carriage movement and thereby provides greater accuracy of the system and particularly in a print line positioning of the paper in a high speed line printer.

The invention further provides for the above correction and control in a positioning system in which advance and stopping is under microprocessor control but in which movement detection and compensation is independent of microprocessor surveillance and control.

Basically the invention provides means which detects the amount of undesired carriage movement from a predetermined stop position when the motor is in an uncontrolled state, i.e. is deenergized, and compensates for the resultant positional error during the controlled movement of the motor. In the specific embodiment in which the invention is practiced, the motor control comprises first and second counters. The first counter is a correction and hold counter coupled to receive first displacement pulses generated by emitter means coupled to the motor. The first displacement pulses produced by the emitter means represent a fine, e.g., ¼ degree, displacement of the motor both during uncontrolled or undesired movement and controlled operation of the motor. The correction and hold counter counts a predetermined number of the first displacement pulses and produces a second displacement pulse representing a coarse, e.g., one degree, displacement of the motor. The second position counter is connected to receive and count the second displacement pulses produced by the correction counter. The second position counter is preset preferably by a microprocessor to count a predetermined number or numbers of second displacement pulses representing a portion of or the total displacement of the motor when operating during its controlled movement operation. Preferably, the correction counter is an up/down counter and the emitter means includes circuit means for supplying a direction signal and said first displacement pulses. The second position counter is also preferably an up/down counter responsive to the direction signals for counting second displacement pulses from the correction counter in either direction. The second position counter is also gated to count the first displacement pulses during detent i.e., while the carriage is at the print line. Thus the invention provides means for precision control of the positioning of paper relative to a print line by determining the amount and direction of error movement of the motor when in its uncontrolled state. Further, the determination of the amount and direction of error movement can be done independently of the microprocessor or other type controller when the motor is in the uncontrolled state and the microprocessor is otherwise occupied with other control functions. Additionally, the compensation is done during the controlled movement of the motor thereby avoiding delay in the positioning operation.

The foregoing and other objects, features and advantages of the invention will be apparent from the following more particular description of a preferred embodiment of the invention, as illustrated in the accompanying drawing.

DETAILED DESCRIPTION OF THE INVENTION

Figure 1:
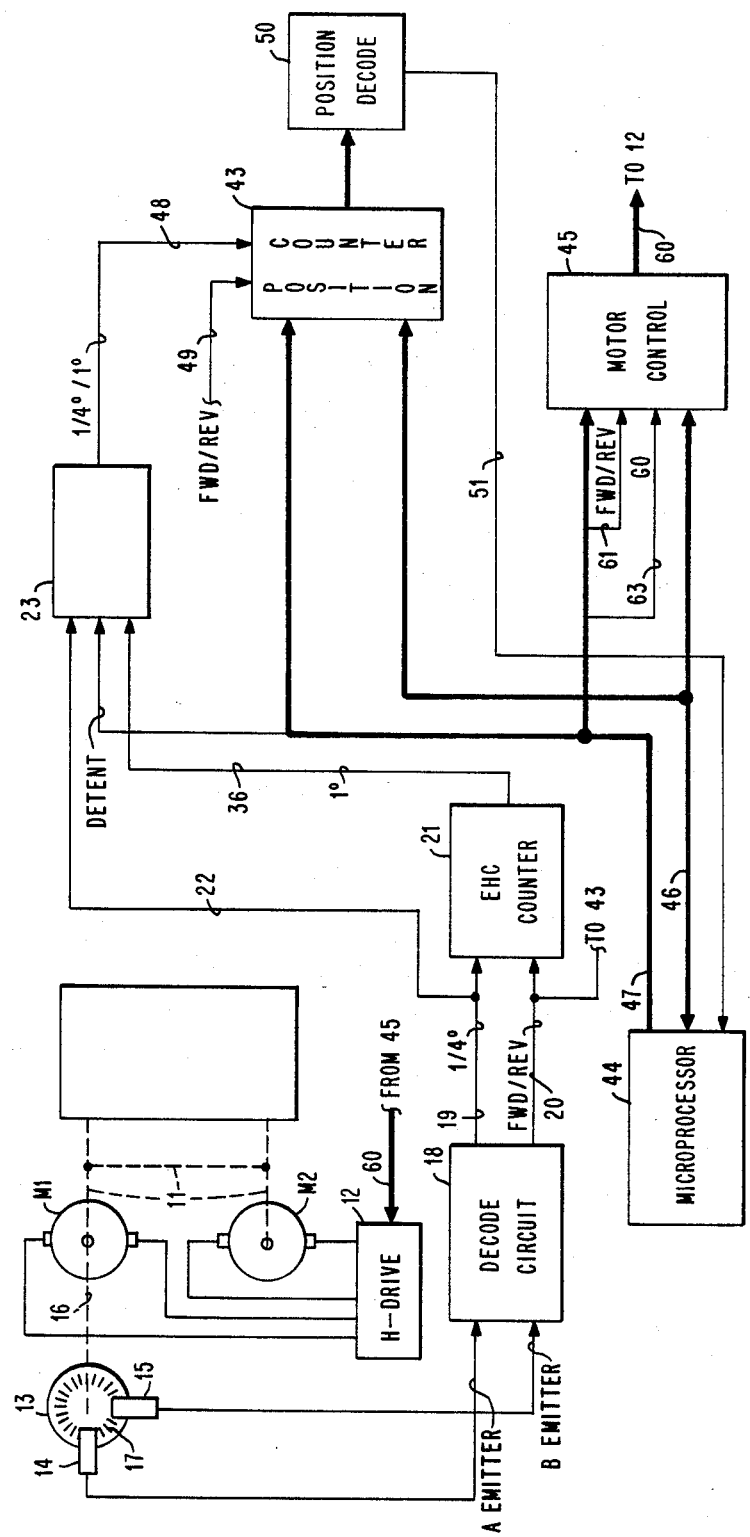
FIG. 1 is an overall schematic diagram of a paper feed control system for a line printer.

As seen in FIG. 1, a forms feed system comprises carriage motors M1 and M2 connected to a transport assembly 10 for a line printer or the like. Transport assembly 10 may be a mechanical assembly including one or more paper feed devices such as paper feed tractors connected to be driven by upper and lower drive shafts rotatably supported on a carriage frame. Motors M1 and M2 which are connected in tandem by suitable gearing or pulleys to the upper and lower drive shafts in any well known manner as indicated by broken lines 11 are preferably high speed low inertia permanent magnet dc servo motors connected to be energized in either forward or reverse directions by motor drive circuits such as H drive circuitry 12. H-drive circuitry 12 is a well known bridge network comprising power transistors which are switched to connect the motors M1 and M2 to a power source to obtain forward and reverse operation.

Figure 4:
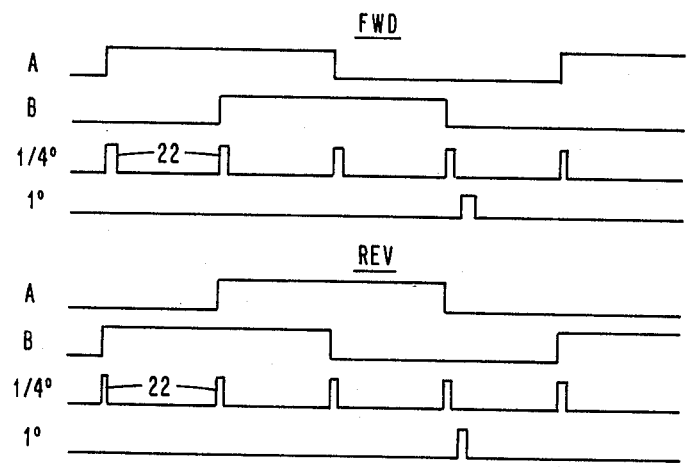
FIG. 4 is a timing chart explaining the operation of the pulse generation decode circuitry of FIG. 2.

The motion indicating means comprises an optical encoder consisting of an emitter disk 13 and optical transducers 14 and 15. Disk 13 is constructed of opaque material having transparent slits 17 arranged in a single circular track. The slits 17 are uniformly spaced. In a preferred embodiment, the angular spacing is one (1) degree. Thus a complete track has three hundred sixty slits 17. Disk 13 is coupled to motors M1 and M2 as indicated by broken line 16 and thus moves synchronously therewith. Transducers 14 and 15 sense light transmitted through slits 17 by a light source not shown and generate binary motion signals A Emitter and B Emitter. Transducers 14 and 15 are angularly spaced and slits 17 made so that motion signals A Emitter and B Emitter are generated in quadrature phase. The A Emitter and B Emitter signals are applied to decode circuit 18 which among other things explained hereinafter converts them to purified binary motion signals A, $\bar{A}$, B, $\bar{B}$ and transition signals A EDGE and B EDGE. As seen in FIG. 4, the purified motion signals A and B are square wave binary signals having leading and trailing edges which are ninety electrical or ¼ mechanical degrees out of phase with each other. The span from the leading edge of signal A or B to the next leading edge thereof represents one degree of rotary motion of disk 13. For forward (FWD) motion, the leading edge of signal A precedes the leading edge of signal B. For reverse (REV) motion, the leading edge of signal B precedes the leading edge of signal A.

The motion indicating means also include means for converting the motion signals A Emitter and B Emitter into fine resolution displacement pulses. Decode circuit 18 receives the binary motion signals A Emitter and B Emitter from transducers 14 and 15, detects the leading and trailing edges thereof, produces purified binary motion signals A and B and generates a short displacement pulse each time a leading or trailing edge is detected. In the embodiment illustrated, decode circuit 18 supplies ¼ degree pulses on line 19 to one input of error hold and compensate EHC counter 21 and on line 22 to switching circuit 23. Decode circuit 18 also decodes the motion signals A and B and produces the binary direction signal FWD/REV which is applied on line 20 to a second input of EHC counter 21.

Figure 3:
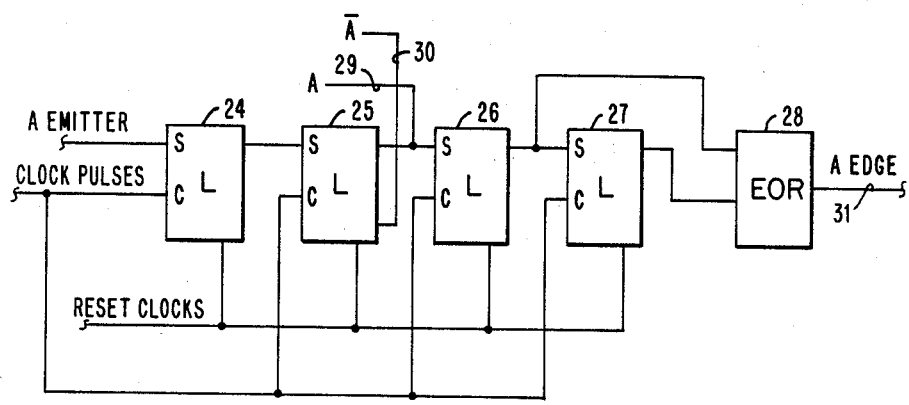
FIG. 3 is a logic diagram showing details of an edge detection circuit of FIG. 1.

FIG. 3 shows an edge detection circuit for producing the purified motion signals A, $\bar{A}$, and an A EDGE detection pulse which comprises series connected latches 24–27 with an output connected to one input of exclusive OR circuit EOR 28. Decode circuit 18 includes a second edge detection circuit for producing purified motion signals B, $\bar{B}$, and B EDGE but is not shown since it is identical in structure and operation to the circuit of FIG. 3. The edge detection circuit of FIG. 3 operates in the following manner. Latch 24 is set by the combination of the leading edge of the A Emitter motion signal from transducer 14 and a specific clock pulse of a series of high resolution clock pulses occurring at selected time periods to activate the latches 24–27 in sequence. Latch 25 is set by a second clock pulse and an output from latch 24. When latch 25 is set, a valid A Emitter has been detected and a purified motion signal A is produced on output line 29. Latches 26 and 27 are sequentially set in the same manner by outputs from latches 25 and 26 in combination with third and fourth clock pulses and ultimately producing A EDGE pulse at EOR 28 on line 31. The width of the A EDGE pulse is determined by the time between latch 26 and latch 27 turning on. When the A Emitter changes state, latches 24–27 are reset sequentially in the same order by a series of reset clock pulses. Latch 24 is reset by the combination of the trailing edge of A Emitter and the first reset clock pulse. Latch 25 is reset by the combination of latch 24 and the second reset clock pulse. In resetting, latch 25 generates purified motion signal $\overline{A}$ on output line 30. Latches 26 and 27 then reset in sequence as previously described whereby EOR 28 produces a second A EDGE signal on line 31. The width of the second A EDGE signal is determined by the time interval between latch 26 and latch 27 going off. Thus the circuit of FIG. 3 detects the leading and trailing edges of the A Emitter signal.

Figure 2:
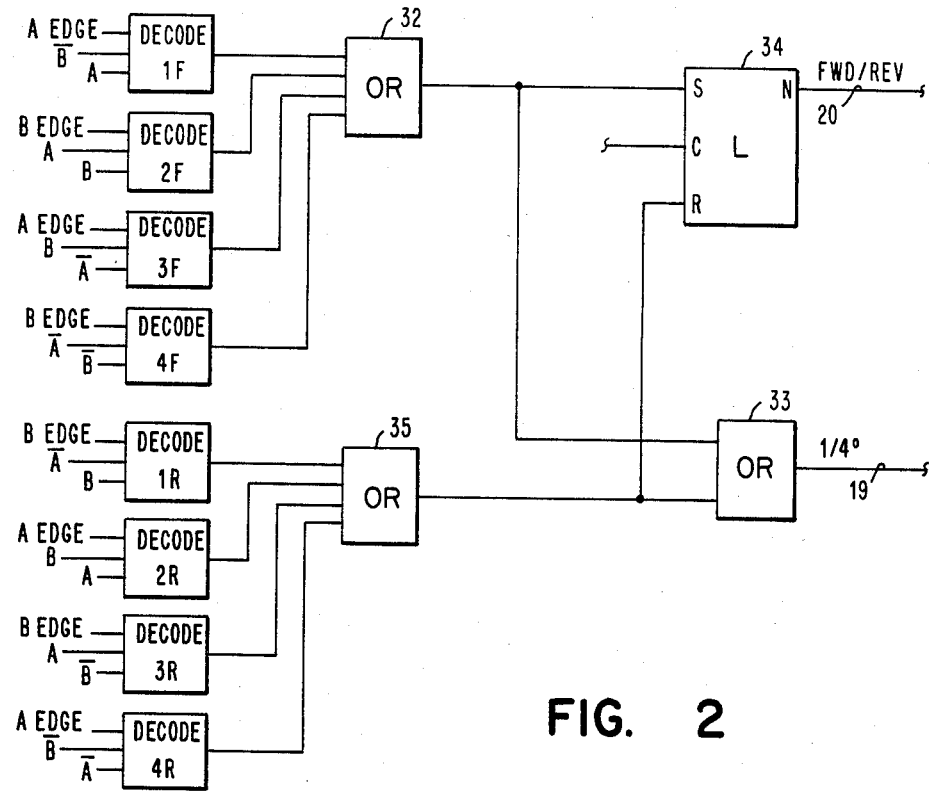
FIG. 2 is a logic diagram showing details of the direction and pulse generating decode circuitry of FIG. 1.

A specific type of decode circuit 18, as shown in FIG. 2, comprises forward decode circuits 1F-4F and reverse decode circuits 1R-4R. The outputs of forward decode circuits 1F-4F are fed through OR circuit 32 to one input of the OR circuit 33 and to the set input S of direction latch 34. The outputs of reverse decode circuits 1R-4R are connected through OR circuit 35 to the second input of OR 33 and the reset input R of direction latch 34. The A and B EDGE signals and the motion signals A, $\overline{A}$, B, and $\overline{B}$ generated by the edge detection circuits as in FIG. 3 are decoded by decode circuits 1F-4F or 1R-4R to actuate OR 33 which generates ¼ degree pulses on line 19. For example, a ¼ degree pulse of a short duration is generated by OR 33 on line 19 by the combination of A EDGE, $\overline{B}$ and A being decoded by decode circuit 1F. Similarly, the combination of A EDGE, $\overline{B}$, and $\overline{A}$ produces a short duration pulse from OR 33 in response to a decode output from decode circuit 4R.

FWD/REV signals are generated on line 20 from the N output of direction latch 34 in response to the sequence in which binary signals A and B from transducers 14 and 15 and the EDGE signals are produced. For example, A EDGE, $\overline{B}$, and A cause decode circuit 1F to set direction latch 34 producing a FWD signal on line 20. If thereafter a B EDGE, A, and B follow, direction latch 34 remains set as a result of the signal from decode circuit 2F through OR circuit 32 to the S input. A REV signal is produced on line 20 by direction latch 34 when reset by signal from decode circuit 1R in response to the combination of inputs B EDGE, $\overline{A}$, and B. Direction latch 34 remains reset by decode circuit 2R if A EDGE, B, and $\overline{A}$ follow.

Basically decode circuit 18 is a frequency multiplier which as seen in FIG. 4 provides fine resolution displacement pulses 22 for each transition of signal A and B. Thus it is possible to have the displacement indicia 17 more widely spaced while producing a fine displacement pulse train. In a particular configuration, emitter disk 13 can have three hundred sixty displacement indicia with one degree spacing. With this arrangement decode circuit 18 produces 1440 ¼ degree displacement pulses for every complete revolution of disk 13 thereby providing precise position control within a movement of one or more line spaces or fractions thereof.

The motion indicating means, in accordance with this invention also includes means for producing coarse resolution displacement pulses which are generated during motion of disk 13 and which represent motion indicative of a larger fraction of a line space. This function is provided by the EHC counter 21 designed to count a predetermined number of fine resolution displacement pulses during extended bidirectional motion of disk 13 and generating a short duration displacement pulse indicating a larger increment of movement each time the predetermined number count is reached. In the embodiment illustrated, and as seen in FIG. 4, EHC counter 21 counts ¼ degree displacement pulses received on line 19 and supplies 1 degree displacement pulses on line 36 to switching circuit 23.

Figure 5:
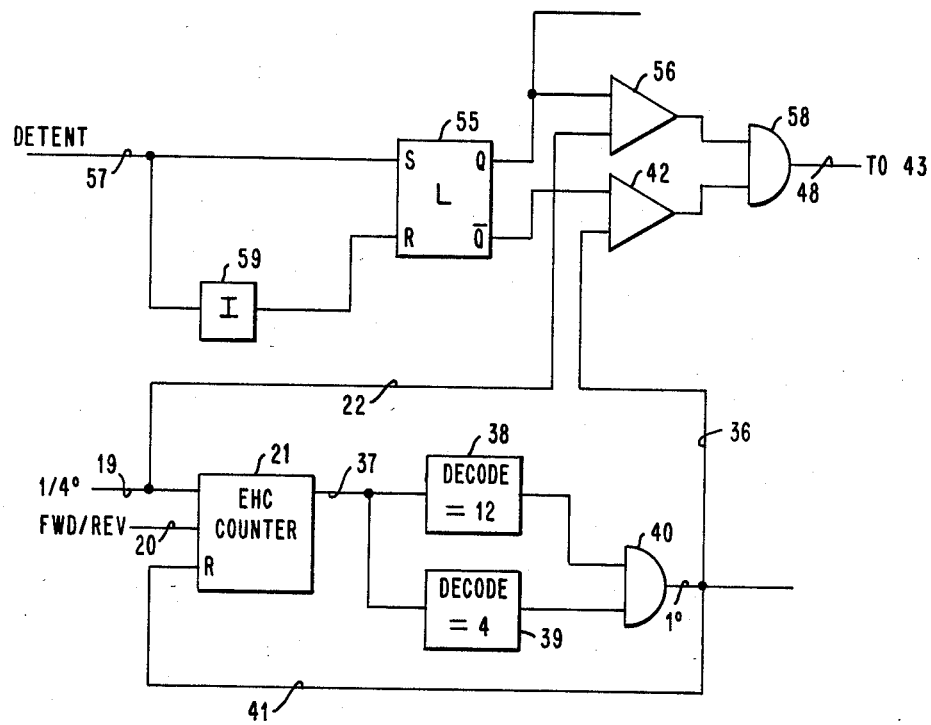
FIG. 5 is a detailed logic diagram of the detent control portion of FIG. 1.

As shown in more detail in FIG. 5, EHC counter 21 is a 4-bit bidirectional counter having an output 37 connected to decode circuits 38 and 39. The outputs of decode circuits 38 and 39 are connected through OR circuit 40 to the reset input R of EHC counter 21 by line 41 and by line 36 to the AND circuit 42 of switching circuit 23. EHC counter 21 is incremented by ¼ degree pulses on line 19 with a FWD direction signal present on line 20. EHC counter 21 is reset to zero by a 1 degree pulse on line 41 from decode circuit 39 each time a four count is reached. EHC counter 21 is decremented by ¼ pulses on line 19 when a REV signal is present on line 20. EHC counter 21 is reset to zero by a 1 degree pulse on line 41 from decoder circuit 38 each time a twelve count is reached.

Motors M1 and M2 are operated to feed a continuous print medium in increments of one or more line spaces and then stop for printing. Each feed operation is performed in accordance with a speed profile in which motors M1 and M2 are accelerated rapidly to a desired velocity. The motors are then operated to maintain the velocity essentially constant. After a predetermined displacement relative to the start position and in advance of the final stop position motors M1 and M2 are electrically braked, i.e., reversed, to cause rapid deceleration and stopping. When the stop position is reached, the motors are deenergized. Because motors M1 and M2 are dc servomotors, they are now essentially uncontrolled and mechanical vibration and other perturbations will cause movement so that the print medium becomes vertically misaligned. In this phase of operation the system monitors the position of the motors M1 and M2 relative to the desired stop position and operates them if movement exceeds a certain tolerance.

Figure 6:
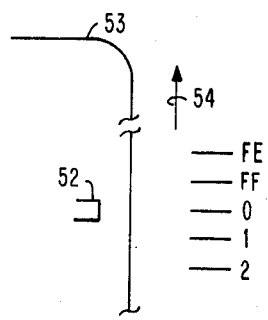
FIG. 6 is a schematic showing a printer carriage mechanism for explaining the operation of the detent control of FIG. 5.

The system for controlling the operation of motors M1 and M2 for positioning a print medium basically consists of position counter 43, microprocessor 44, and drive control 45 interconnected by data bus 46 and address bus 47. Position counter 43 preferably is an 8-bit up/down electronic counter which is incremented or decremented by ¼ or 1 degree displacement pulses received on line 48 from decode circuit 18 and EHC counter 21 via switching circuit 23. A direction signal FWD/REV on line 49 from decode circuit 18 controls position counter 43 to increment or decrement. Position counter 43 has an output connection to a count decode circuit 50 which is designed and operated to generate interrupt requests (IRQ's) on line 51 to microprocessor 44 in response to selected count values registered in position counter 43 during drive and detent operation. A specific count decoded by circuit 50 which results in an IRQ might be binary zero indicative of the position counter 43 having been decremented from a preset number of 1 degree displacement pulses in response to motion of the motors to an intermediate position or to the desired stop position. Other counts decoded by circuit 50 for detecting movement of motors M1 and M2 during printing (detent) might be FF, FE, 0, 1, and 2 indicating specific numbers of displacement pulses generated by decode circuit 18. This is illustrated in FIG. 6 where type element 52 such as a revolving type band defines the print line or 0 position. Counts FF and FE represent ¼ and ½ degree of forward drift movement whereby the line position of print medium 53 is misaligned in the minus direction, i.e., below the print line. Counts 1 and 2 represent ¼ and ½ degree reverse movement whereby the line position of print medium 53 is misaligned in the plus direction, i.e., above the print line. Arrow 54 indicates the forward direction which is the normal direction for feeding print medium 53 to effect line spacing.

As shown in FIG. 5, switching circuit 23 includes a displacement pulse selection latch 55 having Q and $\bar{Q}$ outputs connected to AND circuits 56 and 42 respectively. Using positive logic, a down DETENT signal on line 57 from microprocessor 44 (see also FIG. 1) to the set input S of latch 55 gates 1 degree pulses on line 36 through AND circuit 42 and OR circuit 58 onto line 48 to position counter 43. An up level DETENT signal on line 57 from microprocessor 44 is raised by inverter 59 connected to the rest input R of latch 55. This gates ¼ degree pulses on line 22 from decode circuit 18.

Motor drive control 45 comprises logic circuitry for controlling the direction and current level for operating motors M1 and M2. While the logic circuits of control 45 might take various forms, it could include amplifiers, predrivers and other circuit devices that provide control signals on bus 60 that selectively turn on the power transistors of the H-drive 12 in response to direction signals FWD/REV on line 61 from microprocessor 44 to obtain forward and reverse drive and braking of the motors M1 and M2. Motor drive control 45 might also include a DAC circuit which in response to a digital input applied on data bus 46 with the appropriate address on address bus 47 both from microprocessor 44 would produce an analog signal on bus 60 to H-drive 12 whereby the current level supplied to motors M1 and M2 from the power source associated with H-drive 12 is controlled to obtain the acceleration constant velocity and deceleration of the motors.

Figure 7:
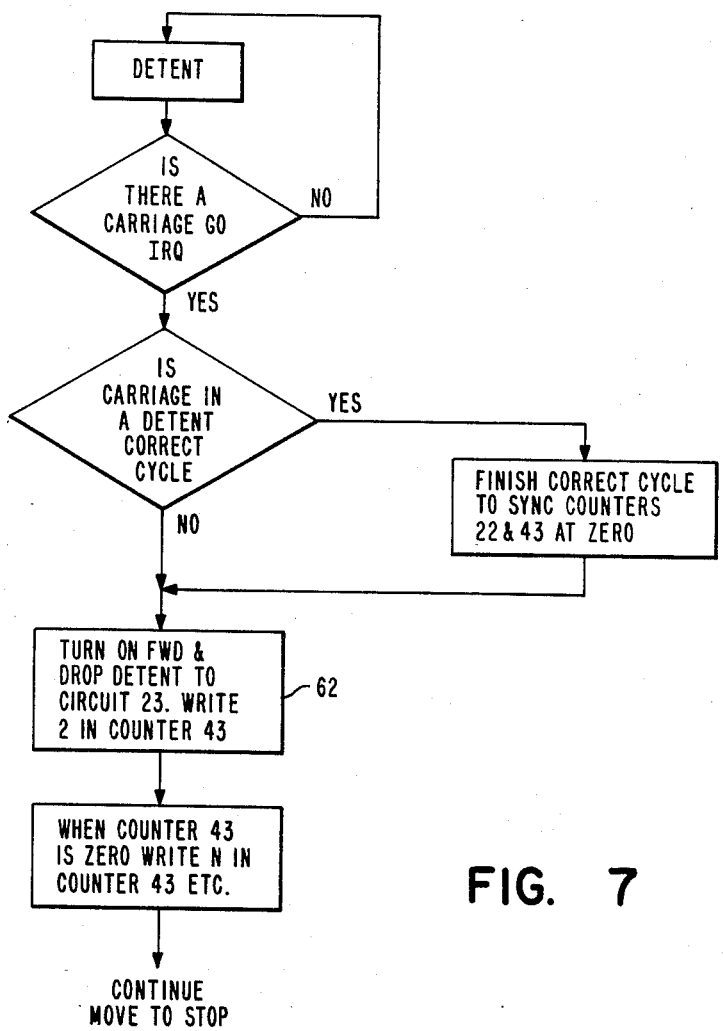
FIG. 7 is a flow chart for showing the operation of the carriage control of FIG. 1 under microprocessor control.

Microprocessor 44 receives commands and data from an external source indicative of the extent of motion required of motors M1 and M2. The external source (not shown) may be a host system which can be a central data processing system, a communication channel connected to a data source, or another microprocessor all of which supply commands and data to be printed. Microprocessor 44 is an electronic data processor using microcode to decode and execute commands to initiate monitor and control the sequence of operations of motors M1 and M2 as previously described. Prior to receipt of a move command from the host system, the microprocessor will be operating the motors M1 and M2 in a detent mode. As previously described microprocessor 44 will have operated switch circuit 23 to gate ¼ degree displacement pulses from decode circuit 18 to position counter 43. A direction signal from decode circuit 18 will determine whether the position counter 43 is counting up or down as a result of drive shaft movement. Note that position counter 43 decrements in response to a FWD signal and increments in response to REV signal on line 49 form decode 18. In accordance with this invention, EHC counter 21 is also counting ¼ degree pulses but in the opposite direction, i.e., EHC counter 21 increments in response to a FWD signal and decrements in response to a REV signal from decode circuit 18 on line 20. If movement exceeds the error limit, an IRQ from position decode 50 activates microprocessor 44 which responds with direction control and digital value to the motor control 45 which switches the H-drive 12 to apply short drive pulses to the motors M1 and M2. This causes the motors M1 and M2 to move in the direction opposite the error movement. In so moving, the position counter 43 and the EHC counter 21 are incremented or decremented until a zero count is again reached and position decode 50 generates a second IRQ which causes microprocessor 44 to terminate motor operation. In the course of the detent mode of operation, a move command may be received by microprocessor 44 which then begins the sequence of operations leading to the execution of the move command. As shown in the flow chart of FIG. 7, microprocessor 44 determines whether a correct cycle is in progress. If so, the operation is completed until position counter 43 again registers a zero count whereupon the start-up procedure is initiated. If not, the start up procedure is initiated immediately as shown by block 62. Microprocessor 44 in accordance with its microcode raises the FWD line 60 to motor control 45, drops the DETENT signal on line 36 to switch circuit 23 thereby activating pulse selection latch 55 to gate 1 degree pulses through AND circuit 42 to position counter 43. Position counter 43 then receives the initial 1 degree pulse count from data bus 46. During the sequence of operation listed in block 62, EHC counter 21 counts and stores ¼ degree pulses generated by decode circuit 18 in response to error movement of motors M1 and M2 as indicated by the quadrature motion signals A Emitter and B Emitter from transducers 14 and 15. Error movement may occur in the forward or reverse directions. Nevertheless, EHC counter 21 counts and stores the ¼ degree displacement pulses independently of microprocessor 44 control. In the embodiment illustrated, EHC counter 21 counts, holds and compensates for error movement over a range of −(i.e., reverse)3(¼) degrees to +(i.e., forward)3(¼) degrees. Thus EHC counter 21 holds a maximum error of 0.75 degrees of movement relative to the zero position and compensates over a range of 1.5 degrees total. Upon completion of the setting of the position counter 43 and the direction signal FWD microprocessor 44 sends a digital value on bus 46, raises the FWD line 61 and issues a GO command to motor control 45 which turns on the H-drive 12 to operate the motors to feed the print medium 53 in the FWD direction. The change of direction is immediately sensed by decode circuit 18 and a FWD signal generated on line 20 to EHC counter 21. If EHC counter 21 has decremented to a negative count, it begins incrementing toward a zero count condition and continues counting until a four count is decoded by decode circuit 39 which generates a 1 degree pulse on line 36 to position counter 43. Thus in effect EHC counter 21 has counted more than four ¼ degree pulses thus compensating for negative misalignment of the print medium 53 with the print line. If shaft movement had occurred in the forward direction prior to the GO command from microprocessor 44 to motor control 45, EHC 21 counter counts less than four ¼ degree pulses after the GO signal before a 1 degree pulse is supplied to position counter 43 thus compensating for positive error and misalignment of the print medium 53.

Thus it will be seen that an improved positioning control system has been provided by the invention in which precise positioning is possible when operating at high incrementing speeds and where positioning errors can occur due to perturbations created by printing and the starting and stopping of the dc motor. It is also apparent that an accurate self compensating positioning system has been provided for precise line spacing of a print medium relative to a print line which operates independently of a microprocessor and allows the microprocessor to be free to perform numerous other operations required before operating to control the incrementing of a print medium at one or more line spaces.

While the invention has been particularly shown and described with reference to a preferred embodiment thereof, it will be understood by those skilled in the art that various changes in form and details may be made therein without departing from the spirit and scope of the invention.

We claim:

1. In a printer system, a carriage for feeding a print medium in increments of one or more line spaces having a drive means and a motion indicating means, said motion indicating means comprising emitter means and a displacement counter, said emitter means being coupled to said drive means for generating first displacement pulses in response to movement of said drive means, said displacement counter being connected to said emitter means for counting said first displacement pulses and generating second displacement pulses by counting a predetermined number of said first displacement pulses, said first and second displacement pulses each being respectively indicative of first and second increments of a line space, a control system for operating said drive means comprising in combination, a position counter, switch means connecting said position counter to said emitter means and to said displacement counter, said switch means being adapted to enable said position counter to receive either said first or said second displacement pulses, and control means including a microprocessor operative to perform a sequence of drive control operations to operate said drive means to effect movement and positioning of said drive means relative to an initial stop line position, said sequence of drive control operations performed by said microprocessor including a first drive control operation for initiating the operation of said drive means to advance said print medium, and a second drive control operation for setting said position counter to count a predetermined number of said second displacement pulses from said displacement counter in response to control signals indicative of the extent of movement by said drive means to advance said print medium from said initial stop line position to a second desired stop line position, said sequence of drive control operations by said microprocessor further including a third drive control operation for activating said switch means to enable said position counter to receive only said second displacement pulses from said displacement counter whereby said displacement counter provides an initial second displacement pulse to said position counter by counting first displacement pulses from said emitter means including first displacement pulses generated by said emitter means as a result of error movement of said drive means occurring during performance of said sequence of drive control operations by said microprocessor.

2. In a printer system in accordance with claim 1 in which said motion indicating means further includes means for generating direction signals indicative of the direction of movement of said drive means, and said displacement counter is a bidirectional counter connected to receive said direction signals from said means for generating direction signals whereby said displacement counter is enabled to make and hold a count of said first displacement pulses generated as a result of bidirectional error movement of said drive means occurring during said sequence of drive control operations by said microprocessor.

3. In a printer system in accordance with claim 2 in which said displacement counter is an up/down counter responsive to said direction signals from said means for generating said direction signals for counting said first displacement pulses in either an up direction or a down direction in response to forward or reverse error movement of said drive means relative to said initial stop line position.

4. In a printer system in accordance with claim 1 wherein said first displacement pulses generated by said emitter means are $\frac{1}{4}$ degree pulses and said second displacement pulses generated by said displacement counter are 1 degree pulses.

5. In a printer system in accordance with claim 2 wherein said first displacement pulses generated by said emitter means are $\frac{1}{4}$ degree pulses and said second displacement pulses generated by said displacement counter are 1 degree pulses, and said bidirectional displacement counter is adapted to make and hold a count of three $\frac{1}{4}$ degree pulses in response to said error movement in either a forward or reverse direction.

* * * * *